(12) United States Patent
Riihiaho

(10) Patent No.: US 11,816,279 B2
(45) Date of Patent: Nov. 14, 2023

(54) PIEZOELECTRIC SENSING DEVICE

(71) Applicant: AITO BV, Amsterdam (NL)

(72) Inventor: Jukka Riihiaho, Vantaa (FI)

(73) Assignee: AITO BV, Amsterdam (NL)

( * ) Notice: Subject to any disclaimer, the term of this patent is extended or adjusted under 35 U.S.C. 154(b) by 0 days.

(21) Appl. No.: 17/592,605

(22) Filed: Feb. 4, 2022

(65) Prior Publication Data

US 2022/0244827 A1    Aug. 4, 2022

(30) Foreign Application Priority Data

Feb. 4, 2021    (FI) ..................................... 20215120

(51) Int. Cl.
*G06F 3/041*    (2006.01)
*G06F 1/3203*    (2019.01)
*G06F 3/01*    (2006.01)

(52) U.S. Cl.
CPC ........ *G06F 3/04144* (2019.05); *G06F 1/3203* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 9,857,913 | B2 | 1/2018 | Day |
| 2005/0078093 | A1 | 4/2005 | Peterson et al. |
| 2015/0022459 | A1 | 1/2015 | Yliaho et al. |
| 2017/0100096 | A1* | 4/2017 | Min ................... G01S 7/52026 |
| 2019/0073507 | A1 | 3/2019 | D'Souza et al. |
| 2019/0179472 | A1* | 6/2019 | Keski-Jaskari ..... G06F 3/04144 |
| 2021/0231472 | A1* | 7/2021 | Bogdanov ............... G01F 25/10 |

FOREIGN PATENT DOCUMENTS

| | | |
|---|---|---|
| EP | 2315102 A1 | 4/2011 |
| EP | 3073354 A1 | 9/2016 |
| WO | 2014115153 A1 | 7/2014 |
| WO | 2020178423 A1 | 9/2020 |

OTHER PUBLICATIONS

Extended European Search Report for Application No. 22155194.8, dated Jun. 24, 2022, 8 pages.
Finnish Office Action for Application No. 20215120, dated Oct. 1, 2021, 2 pages.

* cited by examiner

*Primary Examiner* — Andre L Matthews
(74) *Attorney, Agent, or Firm* — Lippes Mathias LLP

(57) ABSTRACT

It is an object to provide a device for piezoelectric sensing. According to an embodiment, a device comprises a touch surface, a plurality of piezoelectric sensors, wherein the plurality of piezoelectric sensors includes at least a first subset of piezoelectric sensors and a second subset of piezoelectric sensors, and a wakeup circuitry. The wakeup circuitry may be configured to: obtain the electrical signal from each piezoelectric sensor in the plurality of piezoelectric sensors; assign a positive sign to electrical signals obtained from the first subset of piezoelectric sensors and assign a negative sign to electrical signals obtained from the second subset of piezoelectric sensors; produce a sum signal by summing the obtained electrical signals according to the assigned signs; compare the sum signal to a preconfigured condition; and in response to the sum signal fulfilling the preconfigured condition, provide a wakeup signal.

14 Claims, 8 Drawing Sheets

PIEZOELECTRIC SENSING DEVICE

TECHNICAL FIELD

The present disclosure relates to a device, and more particularly to a device for piezoelectric sensors for touch sensing.

BACKGROUND

Piezoelectric sensors may be used to provide haptic effects for a user, to sense touch, or both. For example, a user may use an electronic computing device, such as a laptop computer, via a touch surface. Pressure applied by the user to the touch surface can be converted into electrical signals using piezoelectric sensors and an appropriate electronic circuit can analyse the electronic signals in order to convert them into input commands. It may be desirable to have the touch surface always enabled so that the user can use the device. However, this may introduce other issues, such as increased power consumption.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device for piezoelectric sensing. The foregoing and other objects are achieved by the features of the independent claims. Further implementation forms are apparent from the dependent claims, the description and the figures.

According to a first aspect, a device comprises: a touch surface; a plurality of piezoelectric sensors mechanically coupled to the touch surface, each piezoelectric sensors in the plurality of piezoelectric sensor being configured to convert a force applied to the piezoelectric sensor via the touch surface into an electrical signal, wherein the plurality of piezoelectric sensors includes at least a first subset of piezoelectric sensors and a second subset of piezoelectric sensors; and a wakeup circuitry electrically coupled to the plurality of piezoelectric sensors, wherein the wakeup circuitry is configured to: obtain the electrical signal from each piezoelectric sensor in the plurality of piezoelectric sensors; assign a positive sign to electrical signals obtained from the first subset of piezoelectric sensors and assign a negative sign to electrical signals obtained from the second subset of piezoelectric sensors; produce a sum signal by summing the obtained electrical signals according to the assigned signs; compare the sum signal to a preconfigured condition; and in response to the sum signal fulfilling the preconfigured condition, provide a wakeup signal. The device may be able to, for example, provide the wakeup signal when a user presses onto the touch surface while not providing the wakeup signal in response to common-mode signals in the piezoelectric sensors.

In an implementation form of the first aspect, the preconfigured condition comprises at least one preconfigured threshold value for the sum signal. The device may be able to, for example, efficiently differentiate a signal due to a localised pressure in the piezoelectric sensors and a common-mode signal.

In a further implementation form of the first aspect, the at least one preconfigured threshold value comprises a maximum value for the sum signal, a minimum value for the sum signal, and/or a maximum value for an absolute value of the sum signal. The device may be able to, for example, efficiently and comprehensively differentiate a signal due to a localised pressure in the piezoelectric sensors and a common-mode signal.

In a further implementation form of the first aspect, the device is further configured to adjust the at least one preconfigured threshold value in response to the sum signal fulfilling the threshold value. The device may be able to, for example, adjust the at least one preconfigured threshold for consecutive wakeup events.

In a further implementation form of the first aspect, the wakeup circuitry further comprises a plurality of switches, wherein each switch in the plurality of switches is electrically coupled to a piezoelectric sensor in the plurality of piezoelectric sensors and is configured to assign the piezoelectric sensor to the first subset of piezoelectric sensors or to the second subset of piezoelectric sensors. The device may be able to, for example, change the assignment of the piezoelectric sensors between the first subset and the second subset.

In a further implementation form of the first aspect, the plurality of switches comprises a pre-settable or programmable bank of selection switches. The device may be able to, for example, change the assignment of the piezoelectric sensors between the first subset and the second subset using software and/or other efficient means.

In a further implementation form of the first aspect, the plurality of piezoelectric sensors are geometrically arranged in such a way that each piezoelectric sensor in the first subset of piezoelectric sensors that is not at an edge of the plurality of piezoelectric sensors is neighboured by at least one piezoelectric sensors in the second subset of piezoelectric sensors. The device may be able to, for example, In a further implementation form of the first aspect, the first subset of piezoelectric sensors and the second subset of piezoelectric sensors are geometrically arranged in an alternating pattern.

In a further implementation form of the first aspect, the wakeup circuitry is further configured to: assign a weighting factor to each electrical signal obtained from the plurality of piezoelectric sensors; and produce the sum signal by summing the obtained electrical signals according to the assigned signs and the assigned weighting factors.

In a further implementation form of the first aspect, the device further comprises a control circuitry electrically coupled to the plurality of piezoelectric sensors and to the wakeup circuitry, wherein the wakeup circuitry is further configured to provide the wakeup signal at least to the control circuitry, and wherein the control circuitry is configured to: in response to receiving the wakeup signal while being in standby mode, switch to an active mode.

In a further implementation form of the first aspect, the control circuitry is further configured to: when in the active mode, obtain the electrical signal from each piezoelectric sensor in the plurality of piezoelectric sensors and locate and an object on the touch surface based on the obtained electrical signals.

It is to be understood that the implementation forms of the first aspect described above may be used in combination with each other. Several of the implementation forms may be combined together to form a further implementation form.

According to a second aspect, an electronic computing device comprising the device according to the first aspect, wherein the electronic computing device is configured to wake up from a sleep mode in response to the wakeup signal.

According to third aspect, a method comprises: obtaining an electrical signal from each piezoelectric sensor in a plurality of piezoelectric sensors, wherein the plurality of piezoelectric sensors are mechanically coupled to a touch surface, each piezoelectric sensor in the plurality of piezoelectric sensors being configured to convert a force applied to the piezoelectric sensor via the touch surface into an electrical signal, wherein the plurality of piezoelectric sensors includes at least a first subset of piezoelectric sensors and a second subset of piezoelectric sensors; assigning a positive sign to electrical signals obtained from the first subset of piezoelectric sensors and assigning a negative sign to electrical signals obtained from the second subset of piezoelectric sensors; producing a sum signal by summing the obtained electrical signals according to the assigned signs; comparing the sum signal to a preconfigured condition; and in response to the sum signal fulfilling the preconfigured condition, providing a wakeup signal.

In an implementation form of the third aspect, the preconfigured condition comprises at least one preconfigured threshold value for the sum signal.

In another implementation form of the third aspect, the at least one preconfigured threshold value comprises a maximum value for the sum signal, a minimum value for the sum signal, and/or a maximum value for an absolute value of the sum signal.

It is to be understood that the implementation forms of the third aspect described above may be used in combination with each other. Several of the implementation forms may be combined together to form a further implementation form.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
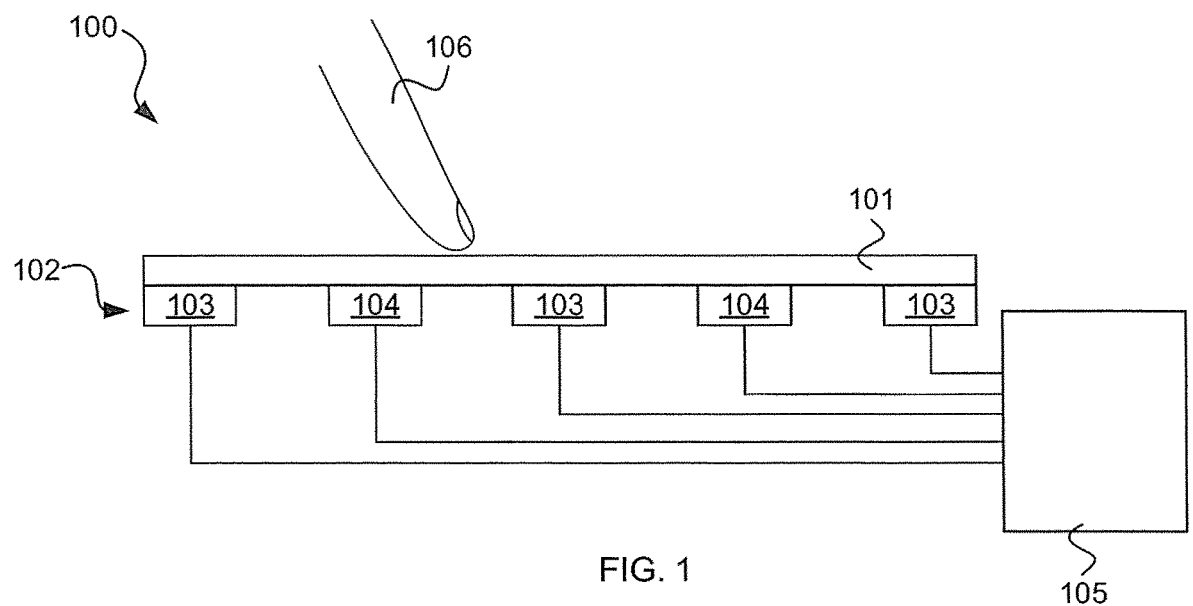
FIG. 1 illustrates a cross-sectional representation of a device according to an embodiment.

FIG. 1 illustrates a schematic representation of a cross section of a device 100 according to an embodiment.

According to an embodiment, the device 100 comprises a touch surface 101 and a plurality of piezoelectric sensors 102 mechanically coupled to the touch surface 101. Each piezoelectric sensor in the plurality of piezoelectric sensor 102 may be configured to convert a force applied to the piezoelectric sensor via the touch surface 101 into an electrical signal. The plurality of piezoelectric sensors 102 may include at least a first subset of piezoelectric sensors 103 and a second subset of piezoelectric sensors 104.

Herein, the first subset of piezoelectric sensors 103 may be referred to simply as a first subset and the second subset of piezoelectric sensors 104 may be referred to simply as a second subset.

The touch surface 101 may also be referred to as a layer, a surface layer, a touch interface surface, or a touch interface layer. The touch surface 101 may be part of a touch user interface. The touch surface 101 may be, for example, a part of a trackpad or a key/button of a laptop computer or a touch screen.

A piezoelectric sensor may also be referred to as a piezoelectric element, a piezoelectric transducer, or similar.

The touch surface 101 may comprise a first side and a second side. The first side may be at least partially unobstructed. A user may touch the first side with an object 106, such as a finger. The object 106 may be, for example, a finger of a user, any other body part of a human, a stylus pen, or some other object held by a user. In the case that the object 106 is a finger, the user may be wearing gloves, and only the fabric of the glove may be in direct contact with the touch surface 101.

The plurality of piezoelectric sensors may be arranged onto the second side of the touch surface 101. The plurality of piezoelectric sensors 102 may be next to the second side, in a close proximity to the second side or situated at a distance from the second side. Each piezoelectric sensor in the plurality of piezoelectric sensors 102 may be configured to convert a mechanical stress in the piezoelectric sensor induced by a force exerted onto the first side of the touch surface 101 by an object 106 into a voltage. The mechanical stress may also be referred to as stress. The voltage may be referred to as electrical voltage, a stress induced voltage, or similar. The voltage may be proportional to the mechanical stress.

Each piezoelectric sensor may comprise piezoelectric material. The piezoelectric material may convert the force/stress applied to the piezoelectric sensors to an electric charge accumulation in the material via the piezoelectric effect, which can be detected as a voltage over the piezoelectric material. This may also be referred to as piezoelectricity.

The voltage induced over a piezoelectric sensor in the plurality of piezoelectric sensors 102 may be proportional to the rate of change of the force/pressure applied by the object 106 to the touch surface 101.

Each piezoelectric sensor in the plurality of piezoelectric sensors 102 may also be configured to convert a voltage applied over the piezoelectric sensor into a mechanical stress via the piezoelectric effect. Thus, when a driving voltage is applied over a piezoelectric sensor, a haptic effect may be induced into the touch surface 101.

Herein, two elements being mechanically coupled may indicate that there is a mechanical connection between the two elements. The two elements may be, for example, in contact with each other or the mechanical connection may be implemented via other elements. For example, the each piezoelectric sensor in the plurality of piezoelectric sensors 102 may be in contact with the touch surface 101 or there may be one or more other elements between the piezoelectric sensor and the touch surface 101. Thus, when a force is applied to the touch surface 101 by an object 106 touching the touch surface 101, the force may be transferred to the piezoelectric sensors 102.

The device 100 may further comprise a wakeup circuitry 105 electrically coupled to the plurality of piezoelectric sensors 102.

The wakeup circuitry 105 may comprise any electrical/electronic circuit configured to implement the functionality disclosed herein. The wakeup circuitry 105 does no need to be implemented as a separate unit/module/device. Rather, the wakeup circuitry 105 may refer to any section of the device 100 that is configured to implement the functionality disclosed herein.

The wakeup circuitry 105 may be configured to obtain the electrical signal from each piezoelectric sensor in the plurality of piezoelectric sensors 102.

The electrical signal may comprise, for example, an electrical voltage or current.

The wakeup circuitry 105 may be configured to obtain the electrical signal, for example, substantially continuously or as discrete samples.

The wakeup circuitry 105 may be further configured to assign a positive sign to electrical signals obtained from the first subset of piezoelectric sensors and assign a negative sign to electrical signals obtained from the second subset of piezoelectric sensors.

Herein, a sign may also be referred to as a polarity, voltage polarity, or similar.

The wakeup circuitry 105 may be configured to assign the signs, for example, via the electrical connections via which the piezoelectric sensors are connected to the wakeup circuitry 105. For example, the first subset 103 may be connected to the wakeup circuitry 105 in such a way that the signal, such as voltage or current, obtained from the first subset 103 is positive and the second subset 104 may be connected to the wakeup circuitry 105 in such a way that the signal obtained from the second subset 104 is negative, or vice versa.

The wakeup circuitry 105 may be further configured to produce a sum signal by summing the obtained electrical signals according to the assigned signs and compare the sum signal to a preconfigured condition.

The wakeup circuitry 105 may be configured to sum the signals using, for example, any appropriate electrical/electronic component or components. For example, the wakeup circuitry 105 may comprise a summing amplifier that may be configured to sum the signals. Alternatively, the wakeup circuitry 105 may comprise passive summing circuit, where window comparators or comparator pairs compare the sum signal to detect if trigger levels are exceeded.

The wakeup circuitry 105 may be further configured to, in response to the sum signal fulfilling the preconfigured condition, provide a wakeup signal.

Herein, a wakeup signal may refer to any signal that is capable of waking up another device/module/component from an inactive mode.

According to an embodiment, the preconfigured condition comprises at least one preconfigured threshold value for the sum signal.

According to an embodiment, the at least one preconfigured threshold value comprises a maximum value for the sum signal, a minimum value for the sum signal, and/or a maximum value for an absolute value of the sum signal.

The wakeup circuitry 105 may be configured to, in response to the sum signal being greater than the maximum value, provide the wakeup signal. Alternatively or additionally, the wakeup circuitry 105 may be configured to, in response to the sum signal being less than the minimum value, provide the wakeup signal. Alternatively or additionally, the wakeup circuitry 105 may be configured to, in response to an absolute value of the sum signal being greater than the maximum value for an absolute value of the sum signal, provide the wakeup signal.

In other embodiments, the preconfigured condition may comprise other conditions. For example, the wakeup circuitry 105 may be configured to provide the wakeup signal in response to the sum signal being greater/less than a threshold value N times within a preconfigured time period, where N may be any natural number. For example, if N=2, a user may wakeup the device 100 using double tap gesture on the touch surface 101, i.e. quickly touching the touch surface 101 twice. Additionally or alternatively, the wakeup circuit 105 may comprise other signal pre-processing, such as bandwidth filtering, to suppress signals beyond an intended signal range. This can be implemented by, for example, adding low-pass filtering to suppress higher frequencies than desired to trigger wakeup, even if amplitude exceeds trigger levels, or high-pass filtering, to suppress lower frequencies than desired, such as slow signal drifts due to temperature changes of offset of sensor signals.

It should be appreciated that the wakeup circuitry 105 may performed any operations disclosed herein substantially continuously. For example, if the wakeup circuitry 105 is implemented as an analogue electronic circuit, the wakeup circuitry 105 may perform the functionality disclosed herein substantially continuously.

According to an embodiment, an electronic computing device comprises the device 100. The electronic computing device may be configured to wake up from a sleep mode in response to the wakeup signal.

The device 100 can wakeup other components/devices via the wakeup signal provided by the wakeup circuitry 105. The wakeup circuitry 105 can cancel so-called common-mode signals. Herein, a common-mode signal may refer to a signal that is obtained from multiple piezoelectric sensors substantially simultaneously. A common-mode signal may be caused, for example, by the mechanical vibrations, or other mechanical or electrical interferences common to multiple/all piezoelectric sensors. For example, when in transport, an electronic computing device, such as a laptop, comprising the device 100 may undergo vibrations. Such vibrations may couple to the touch surface and, therefore, cause a signal in the plurality of piezoelectric sensors 102. However, since the signal is substantially identical for all piezoelectric sensors, the wakeup circuitry 105 can cancel out the signals and not cause the wakeup of other components in the electronic computing device. On the other hand, when a user applies pressure to the touch surface 101 when the electronic computing device is in sleep mode, the signals provided by the piezoelectric sensors are dissimilar from each other, because the pressure applied by the user is more localised. Therefore, the wakeup circuitry does not cancel out the signal from the piezoelectric sensors but provides the wakeup signal that can be used to, for example, wakeup components of the electronic computing device.

The device 100 can decrease the number of false triggers that wake up the system the device 100 is embodied in. For example, a separate circuitry used to analyse the touch input provided by the user to the touch surface 101 can be in sleep mode more often, which can reduce power consumption and improve battery life. Lower count of false triggers can also decrease interrupt events and false triggers to the host system the device 100 is embodied in.

Wakeup trigger levels can be configured to lower values, which increases sensitivity to real wakeup events, since the common-mode signals are attenuated by the wakeup circuitry 105. The common-mode signal rejections/auto-cancellation may allow assembly of less solid structures for support and other mechanical parts and make the electrical circuits of the device 100 more tolerant to electrical interferences. This may relax material requirements and protection devices, allow lower cost parts, allow thinner devices, etc.

The wakeup circuitry 105 may require less hardware and power than monitoring every piezoelectric sensor individually and analysing the results by combining each piezoelectric sensor detection result.

The wakeup circuitry 105 may be implemented using discrete components or as a part of an integrated circuit (IC). With an IC implementation especially, the extra hardware needed for the wakeup circuitry 105 may not be a significant penalty.

The assignment of the piezoelectric sensors between the first 103 and the second subset 104 can be implemented in a flexible fashion using, for example, pre-settable or programmable bank of selection switches or fixed with a dedicated assembly if no flexibility is needed.

According to an embodiment, the wakeup circuitry 105 is further configured to assign a weighting factor to each electrical signal obtained from the plurality of piezoelectric sensors; and produce the sum signal by summing the obtained electrical signals according to the assigned signs and the assigned weighting factors.

The wakeup circuitry 105 may assign the weighting factors, for example, to individual piezoelectric sensors before the summation. Alternatively, the wakeup circuitry 105 may sum signals from the first subsets 103, producing a first sum signal, and sum signals from the second subsets 104, producing a second sum signal. The wakeup circuitry 105 may then assign weighing factors to the first sum signal and to the second sum signal and produce the first and second sum signal according to the assigned weighting factors, producing the sum signal. This way, the wakeup circuitry 105 can, for example, adjust or adapt to different panels/number of piezoelectric sensors, or variation of piezoelectric sensors panel properties or variation of piezoelectric sensors themselves.

Figure 2:
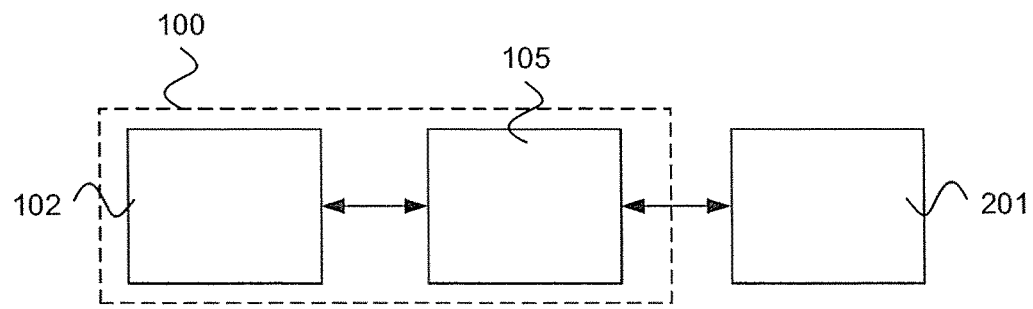
FIG. 2 illustrates a schematic representation of a device providing the wakeup signal to another device according to an embodiment.

FIG. 2 illustrates a schematic representation of the device 100 providing the wakeup signal to another device 201 according to an embodiment.

According to an embodiment, the wakeup circuitry 105 is configured to provide the wakeup signal to another device 201 electrically coupled to the wakeup circuitry 105.

The another device 201 may correspond to, for example, an electronic computing device, such as a laptop computer or some component of an electronic computing device. The device 100 may be embodied in the another device 201. In such cases, the other device 201 may be referred to as a host device. For example, the device 100 may be embodied in a laptop computer and the wakeup signal may wake up the laptop from a sleep mode, hibernation mode, standby mode, suspend mode, or similar. The wakeup signal may correspond to, for example, an appropriate interrupt signal.

Figure 3:
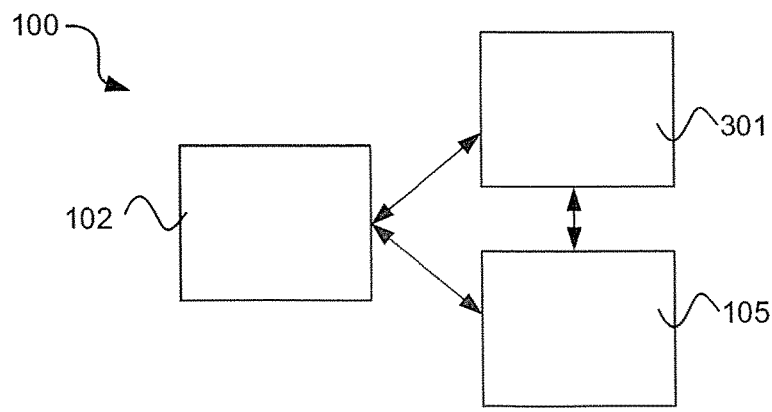
FIG. 3 illustrates a schematic representation of device further comprising a control circuitry.

FIG. 3 illustrates a schematic representation of a device 100 further comprising a control circuitry 301.

According to an embodiment, the device 100 further comprises a control circuitry 301 electrically coupled to the plurality of piezoelectric sensors 102 and to the wakeup circuitry 105. The wakeup circuitry 105 may be further configured to provide the wakeup signal at least to the control circuitry 301. The control circuitry 301 may be configured to, in response to receiving the wakeup signal while being in a standby mode, switch to an active mode.

In some embodiments, the control circuitry 301 may be electrically coupled to the plurality of piezoelectric sensors 102 via the wakeup circuitry 105. In other embodiments, the control circuitry 301 may be coupled to the plurality of piezoelectric sensors separately from the wakeup circuitry 105.

The standby mode may refer to any mode in which the control circuitry 301 is not analysing signals obtained from the plurality of piezoelectric sensors 102 and/or not providing any signals to the plurality of piezoelectric sensors 102. Standby mode may also be referred to as idle mode, low-power mode, sleep mode, or similar.

The control circuitry 301 may be further configured to, when in the active mode, obtain the electrical signal from each piezoelectric sensor in the plurality of piezoelectric sensors 102 and locate an object 106 on the touch surface based on the obtained electrical signals.

The control circuitry 301 may be configured to, for example, locate the object 106 on the touch surface based on the obtained electrical signals and the location of each piezoelectric sensor in the plurality of piezoelectric sensors 102. The control circuitry 301 may, for example, calculate a weighted average of the electrical signals obtained from the plurality of piezoelectric sensors 102.

The control circuitry 301 may comprise at least one processor. The at least one processor may comprise, for example, one or more of various processing devices, such as a co-processor, a microprocessor, a control circuitry 301, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The control circuitry 301 may further comprise a memory. The memory may be configured to store, for example, computer programs and the like. The memory may comprise one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

When the control circuitry 301 is configured to implement some functionality, some component and/or components of the control circuitry 301, such as the at least one processor and/or the memory, may be configured to implement this functionality. Furthermore, when the at least one processor is configured to implement some functionality, this functionality may be implemented using program code comprised, for example, in the memory.

The control circuitry 301 may further comprise, for example, a boost converter circuit, a microprocessor, and other components used to interact with the plurality of piezoelectric sensors 102. The control circuitry 301 may be further configured to, for example, provide haptic feedback via the plurality of piezoelectric sensors 102. The boost converter may provide a high voltage that may be needed to drive the plurality of piezoelectric sensors 102 in the case of haptic feedback.

In some embodiments, the wakeup circuitry 105 may also be implemented as a section of the control circuitry 301, e.g. as a part of IC implementation of the control circuitry 301, or on the same PCB with the control circuitry 301, as a part of combined wakeup and control device.

Figure 4:
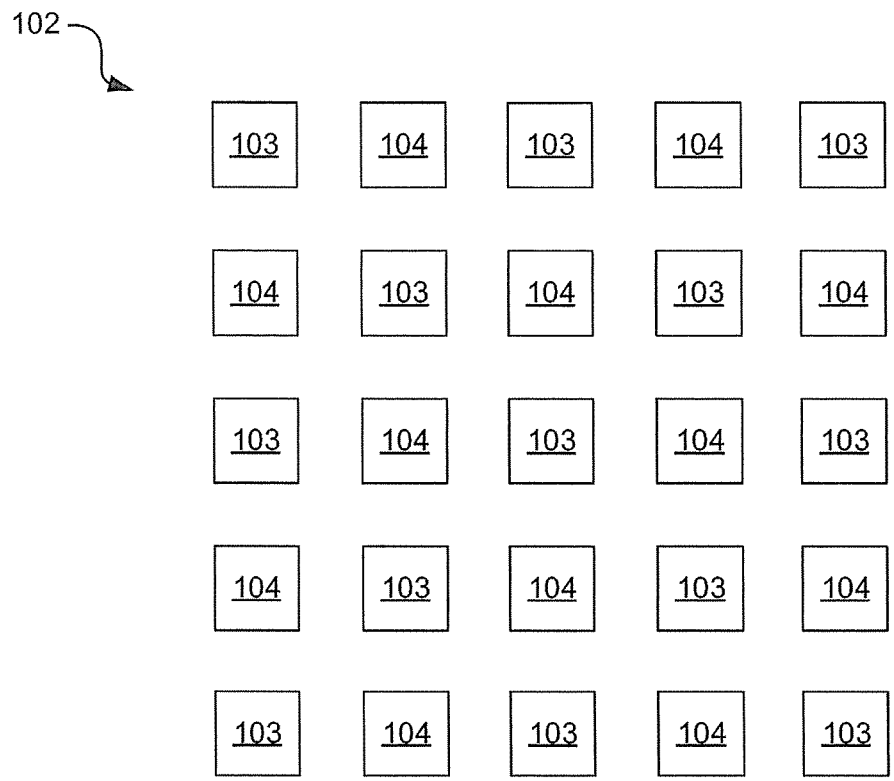
FIG. 4 illustrates a plurality of piezoelectric sensors according to an embodiment.

FIG. 4 illustrates a plurality of piezoelectric sensors 102 according to an embodiment.

According to an embodiment, the plurality of piezoelectric sensors 102 are geometrically arranged in such a way that each piezoelectric sensor in the first subset of piezoelectric sensors 103 that is not at an edge of the plurality of piezoelectric sensors 102 is neighboured by at least one piezoelectric sensors in the second subset of piezoelectric sensors 104.

For example, in the embodiment of FIG. 4, each piezoelectric sensor in the first subset of piezoelectric sensors 103 that is not at an edge of the plurality of piezoelectric sensors 102 is neighboured by four piezoelectric sensors in the second subset of piezoelectric sensors 104.

According to an embodiment, the first subset of piezoelectric sensors 103 and the second subset of piezoelectric sensors 104 are geometrically arranged in an alternating pattern. The pattern may be alternating in one or more directions.

For example, in the example embodiment of FIG. 4, the first subset of piezoelectric sensors 103 and the second subset of piezoelectric sensors 104 alternate in two directions.

In the embodiment of FIG. 4, for each piezoelectric sensor in the plurality of piezoelectric sensors 102, every neighbouring piezoelectric sensors is in a different subset. Thus, for each piezoelectric sensor in the first subset 103, every neighbouring piezoelectric sensor is in the second subset 104 and, for each piezoelectric sensor in the second subset 104, every neighbouring piezoelectric sensor is in the first subset 103.

Since the plurality of piezoelectric sensors 102 in the embodiment of FIG. 4 comprises the same number of piezoelectric sensors in the first subset and 103 and in the second subset 104, common mode signals can be efficiently suppressed by the wakeup circuitry 105. Further, since the first 103 and second subset 104 are geometrically arranged in an alternating pattern, the wakeup circuit 105 can efficiently differentiate a locally applied pressure from a common mode signal.

It should be appreciated that even though, in the embodiments disclosed herein, the plurality of piezoelectric sensors 102 may be illustrated only for a limited number of piezoelectric sensors, the plurality of piezoelectric sensors 102 may comprise any number of piezoelectric sensors. Further, arrangement of the first 103 and second subset 104 may be generalised for any number of piezoelectric sensors by repeating the arrangement in an appropriate manner. For example, the arrangement illustrated in the embodiment of FIG. 4 may be generalised for any number of piezoelectric sensors.

In some embodiments, the plurality of piezoelectric sensors 102 may comprise an odd number of piezoelectric sensors. Thus, the number of piezoelectric sensors in the first 103 and second subset 104 may not be equal. In such embodiments, one piezoelectric sensor may be left out of the first/second subset 103, 104 in order to ensure that common mode signals are cancelled by the wakeup circuitry 105. Alternatively, the wakeup circuitry 105 may be configured to sum signals from two piezoelectric sensors of the larger of the first/second subset with half the weight to the rest of the piezoelectric sensors.

Although some embodiment disclosed herein may illustrate the plurality of piezoelectric sensors 102 in a matrix/array formation, these embodiments are only exemplary. The plurality of piezoelectric sensors 102 may be geometrically arranged in any pattern. For example, if the plurality of piezoelectric sensors 102 are used for a keyboard, each piezoelectric sensor may correspond to a key of the keyboard.

Figure 5:
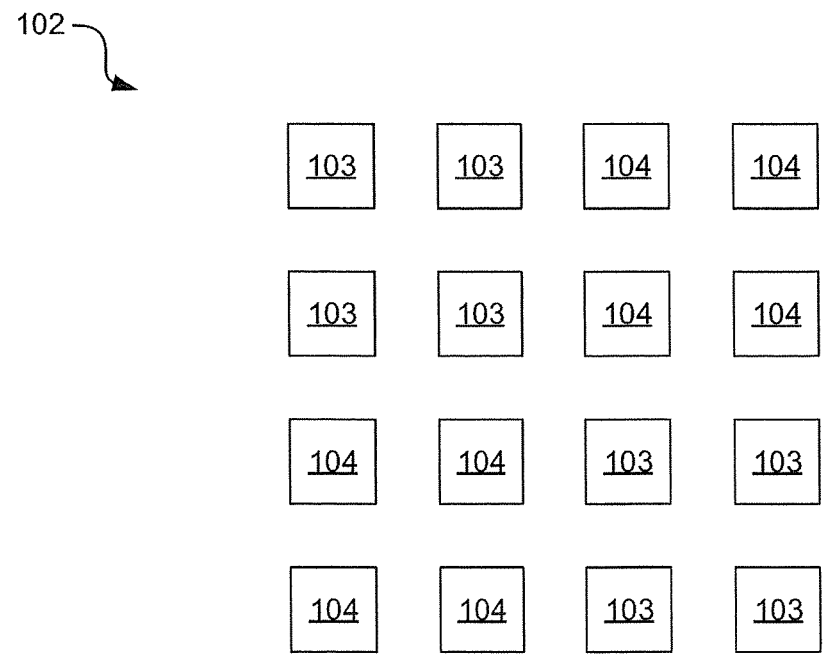
FIG. 5 illustrates a plurality of piezoelectric sensors according to another embodiment.

FIG. 5 illustrates a plurality of piezoelectric sensors 102 according to another embodiment.

In the embodiment of FIG. 5, the piezoelectric sensors in the first subset 103 form square groups of four neighbouring piezoelectric sensors. Similarly, the piezoelectric sensors in the second subset 104 form square groups of four neighbouring piezoelectric sensors. Each group of four in the first subset 103 in neighboured by groups of four in the second subset 104 and vice versa.

Figure 6:
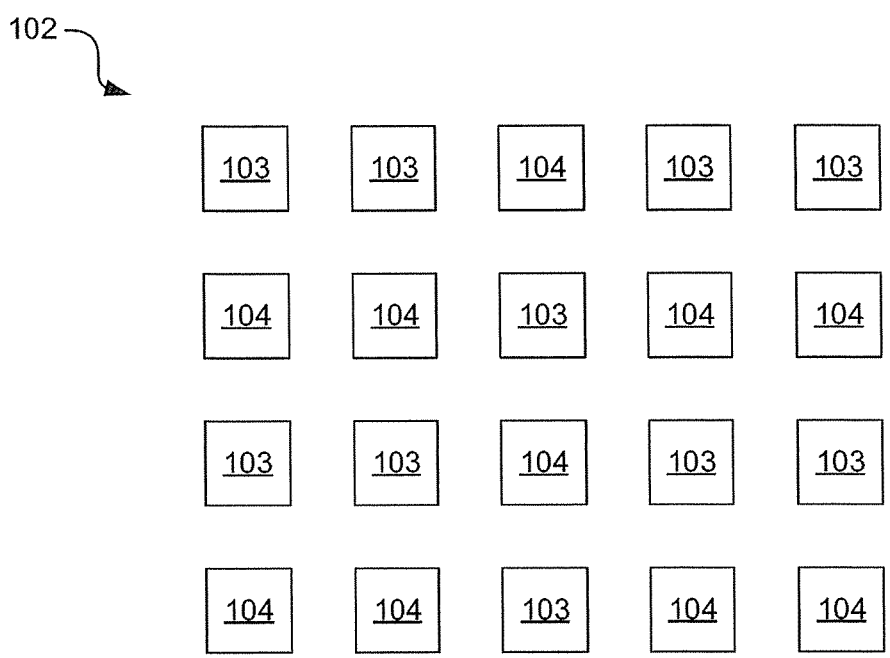
FIG. 6 illustrates a plurality of piezoelectric sensors 102 according to another embodiment.

FIG. 6 illustrates a plurality of piezoelectric sensors 102 according to another embodiment.

In the embodiment of FIG. 6, in one direction (horizontal direction in FIG. 6), the pattern comprises two piezoelectric sensors from one subset, followed by one piezoelectric sensor from the other subset, then followed again by two piezoelectric sensors from the one subset. For example, the top row of FIG. 6 comprises two piezoelectric sensors from the first subset 103, followed by one piezoelectric sensor from the second subset 104, followed again by two piezoelectric sensors form the first subset 103. In the other direction (vertical direction in FIG. 6), the pattern is alternating. Thus, the second row of FIG. 6 comprises two piezoelectric sensors from the second subset 104, followed by one piezoelectric sensor from the first subset 103, followed again by two piezoelectric sensors form the second subset 104.

Although, in some embodiments disclosed herein, all piezoelectric sensors in the plurality of piezoelectric sensors are assigned either to the first subset or to the second subset, this may not be the case for all embodiments. For example, in any embodiment, the plurality of piezoelectric sensors may include a third subset of piezoelectric sensors. Signals from the third subset may be ignored when the sum signal is produced. Although the third subset may not be used for producing the sum signal by the wakeup circuitry 105, other components may use the signals from the third subset in order to, for example, locate an object on the touch surface.

Figure 7:
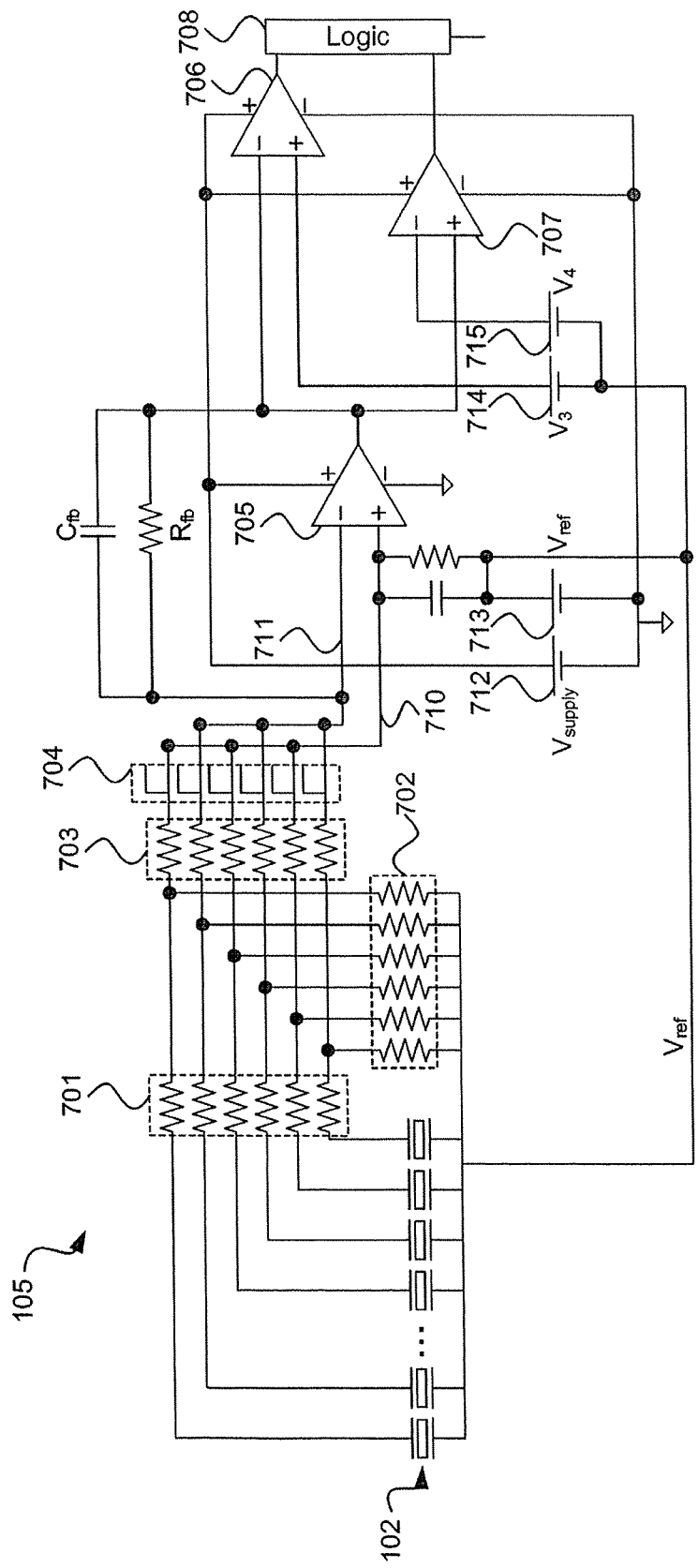
FIG. 7 illustrates a schematic representation of a wakeup circuitry according to an embodiment.

FIG. 7 illustrates a schematic representation of a wakeup circuitry 105 according to an embodiment.

The wakeup circuitry 105 may comprise a plurality of input resistors 701. Each piezoelectric sensor in the plurality of piezoelectric sensors 102 may be electrically coupled to a corresponding input resistor in the plurality of input resistors 701. The other terminal of each piezoelectric sensor not coupled to an input resistor may be electrically coupled to a reference voltage $V_{ref}$.

The plurality of piezoelectric sensors 102 may be modelled as a capacitor. Other electrical/physical properties, such as resistance, inductance, hysteresis, and LC resonance, of the plurality of piezoelectric sensors 102 may also be modelled by adding corresponding electrical components to the model of plurality of piezoelectric sensors 102. For example, a resistor may be added to model the resistive losses in a piezoelectric sensor. An inductor may be added to model the inductance of the piezoelectric sensor. In many cases the capacitive behaviour of the piezoelectric sensor may be dominant, and therefore modelling the piezoelectric sensor as a single capacitor may be sufficient.

The wakeup circuitry 105 may further comprise a plurality of attenuation resistors 702. Each input resistor in the plurality of input resistors 701 may be electrically coupled to a corresponding attenuation resistor in the plurality of attenuation resistors 702.

The other terminal of each attenuation resistors may be electrically coupled to the reference voltage $V_{ref}$. Voltage division between the input resistors 701 and the attenuation resistors 702 sets loading of the piezoelectric sensors 102 and attenuation of signals obtained from the piezoelectric sensors 102.

The wakeup circuitry 105 may further comprise a plurality of weighting resistors 703. Each input resistor in the plurality of input resistors 701 may be electrically coupled to a corresponding weighting resistor in the plurality of weighting resistors 703. The weighting resistors 703 can set the weighting of each signal obtained from each piezoelectric sensor.

Each weighting resistor may be electrically coupled to a positive input line 710 or to a negative input line 711. This can define whether the corresponding piezoelectric sensor belongs to the first subset or to the second subset. For example, each piezoelectric sensor that is electrically coupled to the positive input line 710 may belong to the first subset and each piezoelectric sensor that is electrically coupled to the negative input line 711 may belong to the second subset.

According to an embodiment, the wakeup circuitry 105 further comprises a plurality of switches 704. Each switch in the plurality of switches 704 may be electrically coupled to a piezoelectric sensor in the plurality of piezoelectric sensors 102 and be configured to assign the piezoelectric sensor to the first subset of piezoelectric sensors 103 or to the second subset of piezoelectric sensors 104. It should be appreciated that the switches do not need to be directly coupled to the piezoelectric sensors. For example, in the example embodiment of FIG. 7, the switches 704 are electrically coupled to the piezoelectric sensors 102 via the resistors 701, 703.

Each weighting resistor may be coupled to the positive/negative input line via a corresponding switch. Each switch may be settable between coupling the corresponding weighting resistor to the positive input line and coupling the corresponding weighting resistor to the negative input line. The plurality of switches 704 may be implemented using, for example, a pre-settable or a programmable bank of selection switches.

According to an embodiment, the plurality of switches 704 comprises a pre-settable or programmable bank of selection switches.

The wakeup circuitry 105 may further comprise an amplifier 705, such as an operational amplifier (op amp). The positive input line 710 may be coupled to the positive input terminal of the amplifier 705 and the negative input line 711 may be coupled to the negative input terminal of the amplifier 705. Thus, the amplifier 705 can produce a sum signal to the output of the amplifier 705 by summing the electrical signals from the piezoelectric sensors 102. Further, since the piezoelectric sensors 102 can be electrically coupled to the positive and negative input terminals of the amplifier 705 in the manner disclosed above, the amplifier 705 can sum the signals of the first subset with a positive sign and the signals of the second subset with a negative sign.

When the amplifier 705 is implemented using an op amp, other electrical components may be needed. For example, in the embodiments of FIG. 7, the wakeup circuitry 105 further comprises a feedback capacitor $C_{fb}$ and a feedback resistor $R_{fb}$ coupled between the output of the op amp 705 and the negative input terminal of the op amp 705. The $C_{fb}$ and $R_{fb}$ can set the amplification and bandwidth of the op amp 705. In the embodiment of FIG. 7, the wakeup circuitry 105 further comprises a first voltage supply 712 providing a supply voltage $V_{supply}$ for the op amp 705 and a second voltage supply 713 providing the reference voltage $V_{ref}$. The second voltage supply 713 may be coupled to the positive input terminal of the op amp 705 via a capacitor and a resistor in parallel. $V_{ref}$ may be between 0 volts and $V_{supply}$ and can adjust the dynamic range of the op amp 705.

In some embodiments, $V_{ref}$ may not be used. In such embodiments, $V_{ref}$ may be replaced with a ground.

The wakeup circuitry 105 may further comprise a first comparator 706 and a second comparator 707. The output of the amplifier 705 may be coupled to the negative input terminal of the first comparator 706 and to the positive input terminal of the second comparator 707. The wakeup circuitry 105 may further comprise a third voltage supply 714 electrically coupled to the positive input terminal of the first comparator 706 and a fourth voltage supply 715 electrically coupled to the negative input terminal of the second comparator 707. Thus, the third input voltage 714 can define a negative threshold voltage and when the sum signal is less than the negative threshold voltage, the output of the first comparator 706 can be a logically high voltage, such as $V_{supply}$. Similarly, the fourth input voltage 715 can define a positive threshold voltage and when the sum signal is greater than the positive threshold voltage, the output of the second comparator 707 can be a logically high voltage.

The third/fourth voltage supply 714, 715 may be controlled by, for example, the host system. Thus, the host system may control the sensitivity of the wakeup circuitry 105.

The first voltage supply 712 may be electrically coupled to the first comparator 706 and to the second comparator 707 in order to provide supply voltage to the comparators 706, 707.

In other embodiments, the wakeup circuitry 105 may comprise only one comparator instead of two as illustrated in the embodiment of FIG. 7. Using one comparator, the wakeup circuitry 105 may be configured to compare the sum signal to one threshold voltage. Alternatively, the wakeup circuitry 105 may compare the sum signal to multiple threshold voltages using different threshold voltages during different time windows.

The wakeup circuitry 105 may further comprise a logic circuit 708 electrically coupled to the output of the first comparator 706 and of the second comparator 707. The logic circuit 708 may be configured to provide the wakeup signal to the output of the logic circuit 708 in response to the first/second comparator providing a logically high voltage.

Although some components of the device 100 are illustrated as parts of the wakeup circuitry 105, this is not the only way in which the device 100 may be implemented and the wakeup circuitry 105 does not need to be implemented as a single unit. Rather, the wakeup circuitry 105 may refer to various components in the device 100 that are used to implement functionality of the wakeup circuitry 105 as disclosed herein.

Figure 8:
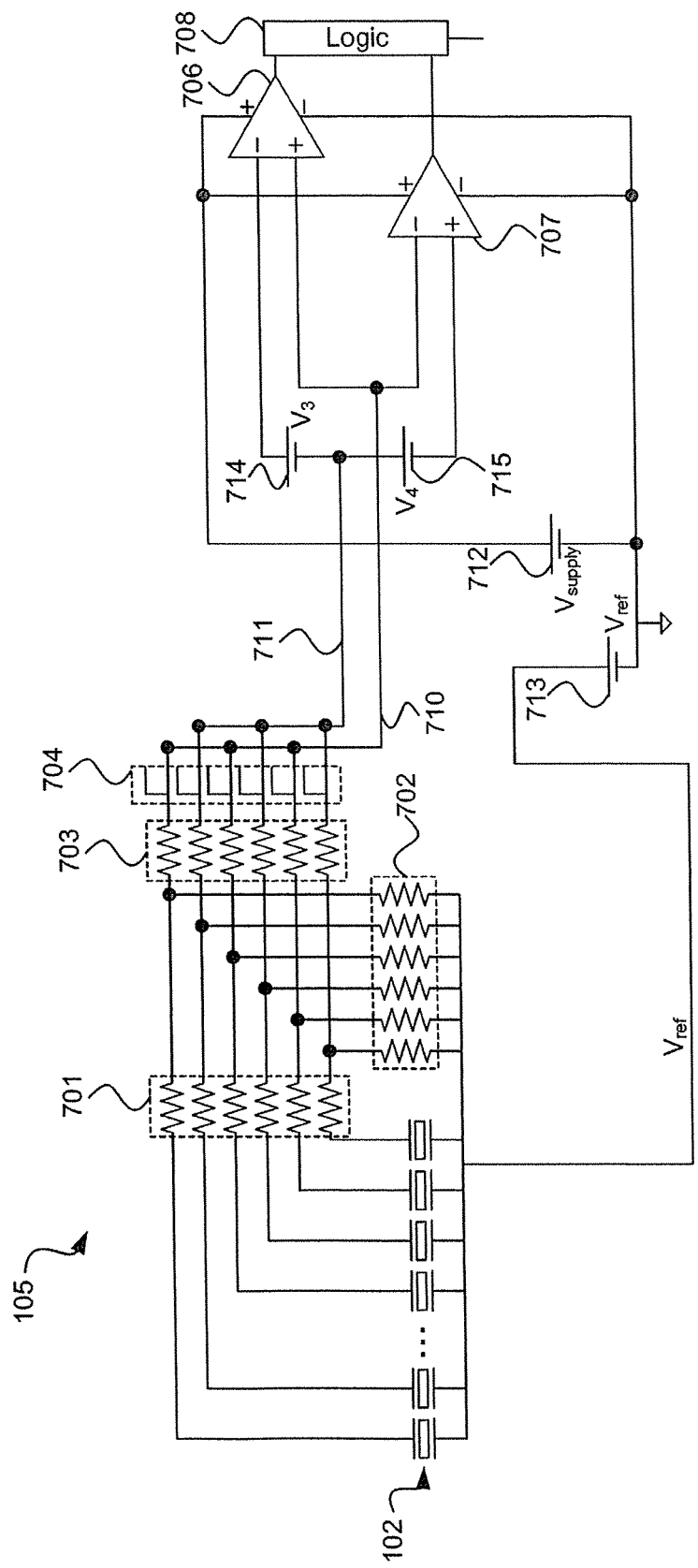
FIG. 8 illustrates a schematic representation of a wakeup circuitry according to another embodiment.

FIG. 8 illustrates a schematic representation of a wakeup circuitry 105 according to another embodiment.

The embodiment of FIG. 8 is similar to the embodiment of FIG. 7. Thus, any disclosure herein in relation to the embodiment of FIG. 7 may also apply to the embodiment of FIG. 8 unless indicated otherwise explicitly or implicitly.

The wakeup circuitry 105 in the embodiment of FIG. 8 may implement the summing of the signals obtained from the piezoelectric sensors passively. Thus, the wakeup circuitry 105 may not comprise a summing amplifier.

In the embodiment of FIG. 8, the positive input line 710 may be coupled to the positive input terminal of the first comparator 706 and the negative input line 711 to the negative input terminal of the second comparator 707. The negative input line 711 may be coupled to the negative terminal of the third voltage supply 714 and to the positive terminal of the fourth voltage supply 715. The positive terminal of the third voltage supply 714 may be coupled to the negative input terminal of the first comparator 706 and the negative terminal of the fourth voltage supply 715 may be coupled to the positive input terminal of the second comparator 707. Thus, the sum signal is between the positive input line 710 and the negative input line 711. The first comparator 706 can compare the sum signal to a positive threshold voltage defined by the third voltage supply 714 and the second comparator 706 can compare the sum signal to a negative threshold voltage defined by the fourth voltage supply 715.

Similarly to the embodiment of FIG. 7, the comparison between the sum signal and the thresholds may be implemented using a single comparator also in the embodiment of FIG. 8. Using one comparator, the wakeup circuitry 105 may be configured to compare the sum signal to one threshold voltage. Alternatively, the wakeup circuitry 105 may compare the sum signal to multiple threshold voltages using different threshold voltages during different time windows.

Figure 9:
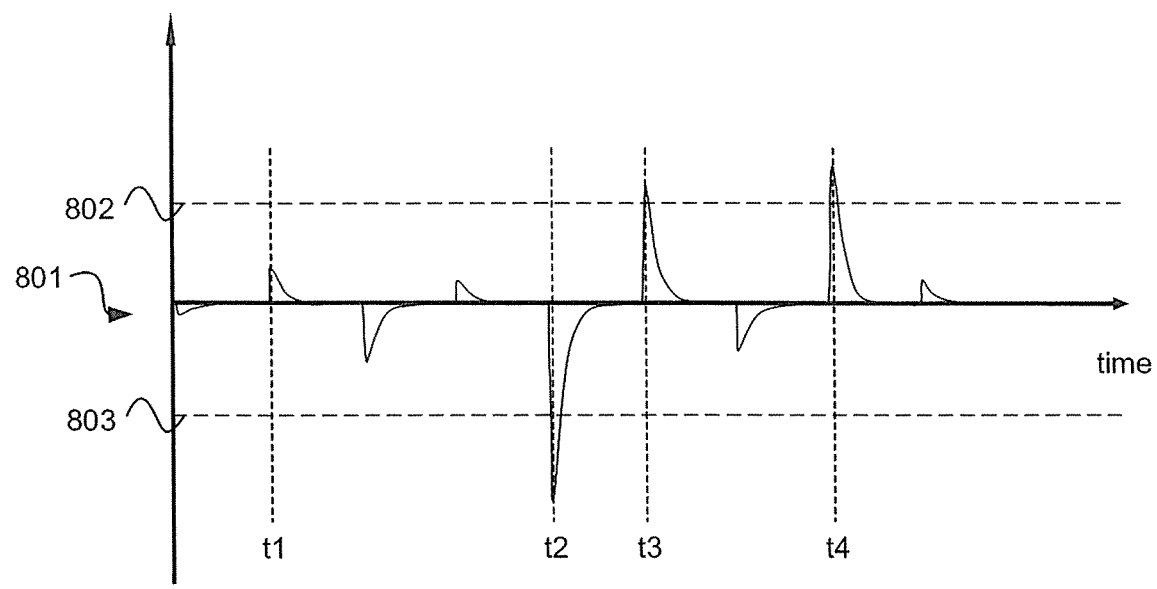
FIG. 9 illustrates a plot representation of a sum signal according to an embodiment.

FIG. 9 illustrates a plot representation of a sum signal 801 according to an embodiment.

As can be seen from FIG. 9, the sum signal 801 comprises various peaks. Some of the peaks may correspond to common mode signals and some of the peaks may correspond to more localised pressure, due to for example a user touching the surface with a finger, in the plurality of piezoelectric sensors 102. In the embodiment of FIG. 9, the applied signal is 10% greater for one piezoelectric sensor than for other piezoelectric sensors in order to illustrate a practical situation where all of the piezoelectric sensors may not be identical.

Two threshold values 802, 803 are also illustrated in the embodiment of FIG. 9. The wakeup circuitry 105 may be configured to provide the wakeup signal if the sum signal 801 is greater than the positive threshold value 802 or if the sum signal 801 is less than the negative threshold value 803.

At time instant t1, a common-mode pulse is applied to each piezoelectric sensor in the plurality of piezoelectric sensors 102. As can be seen from FIG. 9, the sum signal 801 does not exceed the threshold values 802, 803. Thus, the wakeup circuitry 105 does not provide the wakeup signal. Further common mode pulses are also applied at later time instances and the sum signal 801 does not exceed the threshold values 802, 803 at the time instances either.

At time instances t2, t3, and t4, more localised pressure is applied to the plurality of piezoelectric sensors 102. Thus, larger peaks can be observed in the sum signal 801, and, therefore, the sum signal 801 exceeds the threshold values 802, 803 at these time instances. At time instance t2, the sum signal 801 is less than the negative threshold value 803. This may correspond to a situation in which most of the pressure is applied to a piezoelectric sensor belonging to a subset that is assigned a negative sign. On the other hand, at time instances t3 and t4, the sum signal 801 is greater than the positive threshold value 802. This may correspond to situations in which most of the pressure is applied to a piezoelectric sensor belonging to a subset that is assigned a positive sign.

According to an embodiment, the device 100 is further configured to adjust the at least one preconfigured threshold value in response to the sum signal fulfilling the threshold value.

In some embodiments, the threshold values 802, 803 may be adjustable. For example, the device 100 may set an initial threshold value to a greater value, and after first wake up, set the threshold value to a lower value to make the device more sensitive.

Figure 10:
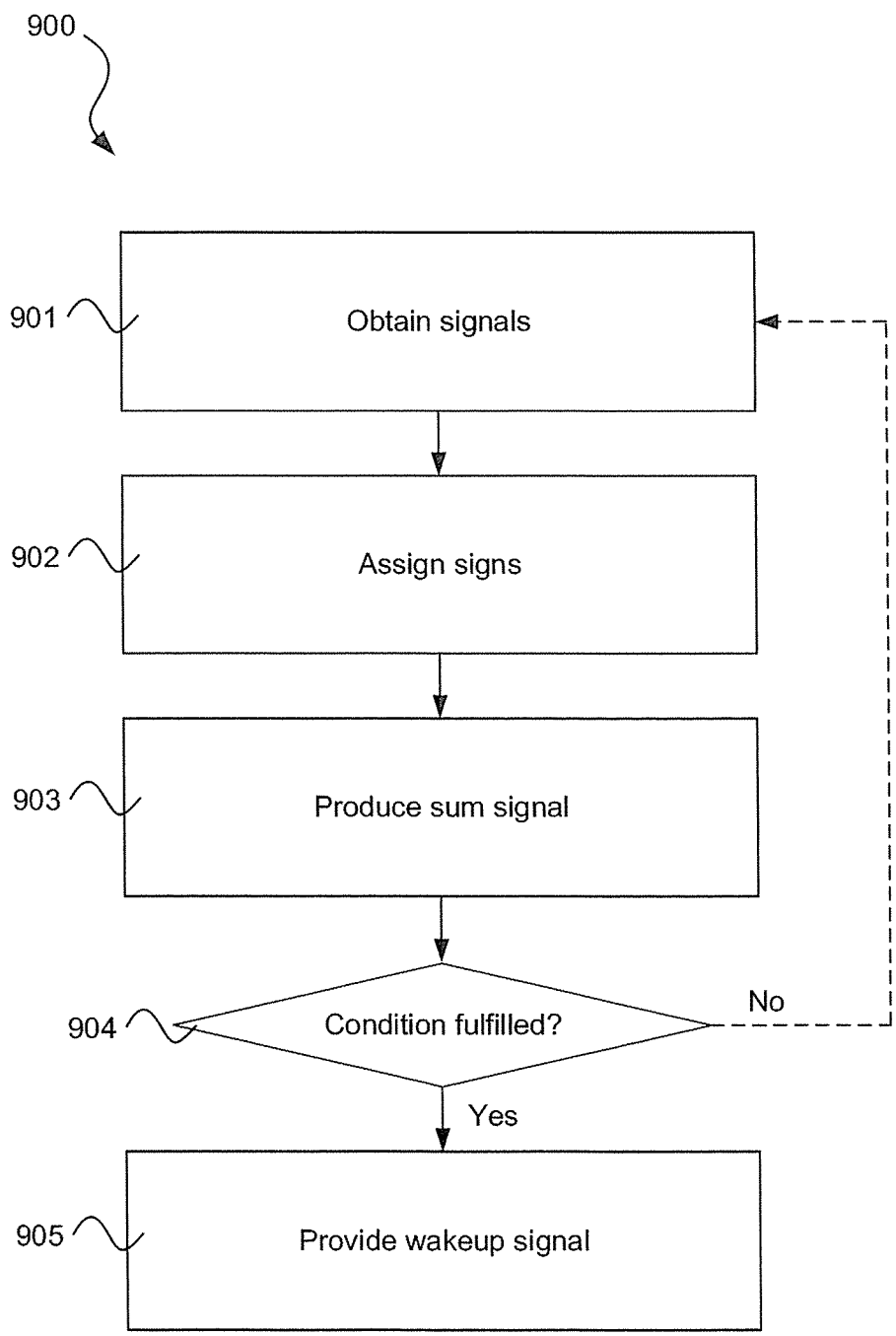
FIG. 10 illustrates a flow chart representation of a method according to an embodiment.

FIG. 10 illustrates a flow chart representation of a method 900 according to an embodiment.

According to an embodiment, the method 900 comprises obtaining 901 an electrical signal from each piezoelectric sensor in a plurality of piezoelectric sensors. The plurality of piezoelectric sensors may be mechanically coupled to a touch surface. Each piezoelectric sensor in the plurality of piezoelectric sensors may be configured to convert a force applied to the piezoelectric sensor via the touch surface into an electrical signal. The plurality of piezoelectric sensors may include at least a first subset of piezoelectric sensors and a second subset of piezoelectric sensors.

The method 900 may further comprise assigning 902 a positive sign to electrical signals obtained from the first subset of piezoelectric sensors and assigning 902 a negative sign to electrical signals obtained from the second subset of piezoelectric sensors.

The method 900 may further comprise producing 903 a sum signal by summing the obtained electrical signals according to the assigned signs.

The method 900 may further comprise comparing 904 the sum signal to a preconfigured condition.

The method 900 may further comprise, in response to the sum signal fulfilling the preconfigured condition, providing 905 a wakeup signal.

If the preconfigured condition is not fulfilled, the method 900 may return back to operation 901 in order to obtain new electrical signals.

The method 900 may be performed by, for example, the wakeup circuitry 105.

Figure 11:
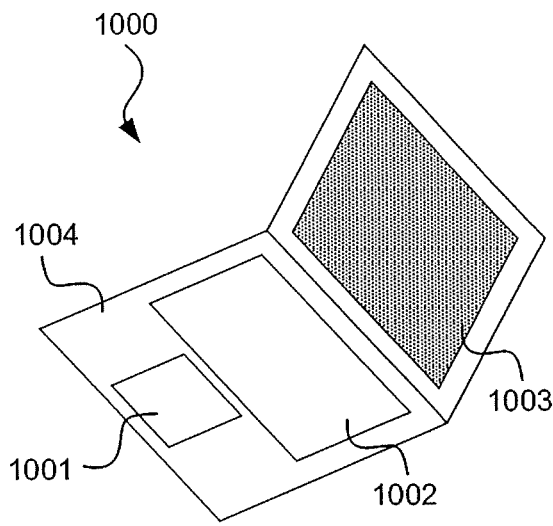
FIG. 11 illustrates a schematic representation of an electronic computing device according to an embodiment.

FIG. 11 illustrates a schematic representation of a laptop computer 1000 according to an embodiment.

The laptop computer 1000 may comprise a trackpad 1001. The trackpad 1001 may also be referred to as a touchpad or similar. The laptop computer 1400 may further comprise a keyboard 1002, a screen 1003, and a chassis 1004. The laptop computer 1000 may further comprise various other components not depicted in the embodiment of FIG. 11.

Although some embodiments may be disclosed herein using a laptop computer as an example, these embodiments apply in a similar fashion to any other electronic computing device, such as a smart phone, a tablet, or similar.

The laptop computer 1000 may comprise the device 100. For example, the touch surface 101 of the device 100 may correspond to the top surface of the trackpad 1001. Thus, a user may operate the laptop computer 1000 using the trackpad 1001. The laptop computer 1000 may be configured to wake up from a sleep mode or similar mode an in response to the wakeup signal provided by the wakeup circuitry 105. The wakeup signal may correspond to, for example, an interrupt signal or similar signal that can wakeup the laptop computer 1000, and the wakeup circuitry 105 may provide the wakeup signal to a processor of the laptop computer 1000. Thus, the laptop computer 1000 can wake up in response to a user pressing on the trackpad 1001. Since the wakeup circuitry 105 can cancel common mode signals, the laptop 1000 is less probable to wake up in response to, for example, mechanical or electrical noise sources, such as vibrations when the laptop 1000 is being transported.

Figure 12:
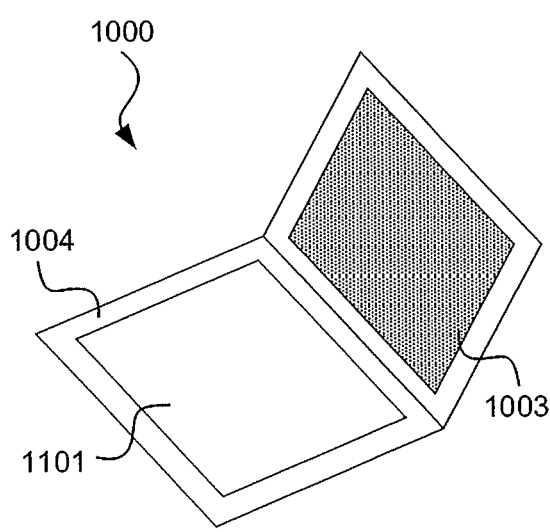
FIG. 12 illustrates a schematic representation of an electronic computing device according to another embodiment.

FIG. 12 illustrates a schematic representation of a laptop computer 1000 according to another embodiment.

In the embodiment of FIG. 12, the laptop computer 1000 comprises a large touch surface 1101. The large touch surface 1101 may, for example, replace the functionality of the trackpad 1001 and of the keyboard 1002. The touch surface 1101 may comprise, for example, a display that can display a virtual keyboard to the user. The control circuitry 301 can locate touch inputs on the touch surface 1101 and map the touches inputs to key presses on the virtual keyboard. Such a virtual keyboard may provide a high degree of flexibility, since the keyboard layout can be changed in software. Thus, physically different versions, with for example ANSI and ISO keyboard layouts, of the laptop computer 1000 do not need to be manufactured. Further, the keyboard can even be changed based on what software is running on the laptop computer 1000. For example, in games, the keyboard may be replaced by a touch input scheme appropriate for the game in question.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   a touch surface;
   a plurality of piezoelectric sensors mechanically coupled to the touch surface, each piezoelectric sensors in the plurality of piezoelectric sensor being configured to convert a force applied to the piezoelectric sensor via the touch surface into an electrical signal, wherein the plurality of piezoelectric sensors includes at least a first subset of piezoelectric sensors and a second subset of piezoelectric sensors; and
   a wakeup circuitry electrically coupled to the plurality of piezoelectric sensors, wherein the wakeup circuitry is configured to:
   obtain the electrical signal from each piezoelectric sensor in the plurality of piezoelectric sensors;
   assign a positive sign to electrical signals obtained from the first subset of piezoelectric sensors and assign a negative sign to electrical signals obtained from the second subset of piezoelectric sensors;
   assign a weighting factor to each electrical signal obtained from the plurality of piezoelectric sensors;
   produce a sum signal by summing the obtained electrical signals according to the assigned signs and the assigned weighting factors;
   compare the sum signal to a preconfigured condition; and
   in response to the sum signal fulfilling the preconfigured condition, provide a wakeup signal.

2. The device according to claim 1, wherein the preconfigured condition comprises at least one preconfigured threshold value for the sum signal.

3. The device according to claim 2, wherein the at least one preconfigured threshold value comprises a maximum value for the sum signal, a minimum value for the sum signal, and/or a maximum value for an absolute value of the sum signal.

4. The device according to claim 3, wherein the device is further configured to adjust the at least one preconfigured threshold value in response to the sum signal fulfilling the threshold value.

5. The device according to claim 1, wherein the wakeup circuitry further comprises a plurality of switches, wherein each switch in the plurality of switches is electrically coupled to a piezoelectric sensor in the plurality of piezoelectric sensors and is configured to assign the piezoelectric sensor to the first subset of piezoelectric sensors or to the second subset of piezoelectric sensors.

6. The device according to claim 5, wherein the plurality of switches comprises a pre-settable or programmable bank of selection switches.

7. The device according to claim 1, wherein the plurality of piezoelectric sensors are geometrically arranged in such a way that each piezoelectric sensor in the first subset of piezoelectric sensors that is not at an edge of the plurality of piezoelectric sensors is neighboured by at least one piezoelectric sensors in the second subset of piezoelectric sensors.

8. The device according to claim 1, wherein the first subset of piezoelectric sensors and the second subset of piezoelectric sensors are geometrically arranged in an alternating pattern.

9. The device according to claim 1, further comprising a control circuitry electrically coupled to the plurality of piezoelectric sensors and to the wakeup circuitry, wherein the wakeup circuitry is further configured to provide the wakeup signal at least to the control circuitry, and wherein the control circuitry is configured to:
in response to receiving the wakeup signal while being in standby mode, switch to an active mode.

10. The device according to claim 9, wherein the control circuitry is further configured to:
when in the active mode, obtain the electrical signal from each piezoelectric sensor in the plurality of piezoelectric sensors and locate and an object on the touch surface based on the obtained electrical signals.

11. An electronic computing device comprising the device according to claim 1, wherein the electronic computing device is configured to wake up from a sleep mode in response to the wakeup signal.

12. A method, comprising:
obtaining an electrical signal from each piezoelectric sensor in a plurality of piezoelectric sensors, wherein the plurality of piezoelectric sensors are mechanically coupled to a touch surface, each piezoelectric sensor in the plurality of piezoelectric sensors being configured to convert a force applied to the piezoelectric sensor via the touch surface into an electrical signal, wherein the plurality of piezoelectric sensors includes at least a first subset of piezoelectric sensors and a second subset of piezoelectric sensors;
assigning a positive sign to electrical signals obtained from the first subset of piezoelectric sensors and assigning a negative sign to electrical signals obtained from the second subset of piezoelectric sensors;
assigning a weighting factor to each electrical signal obtained from the plurality of piezoelectric sensors;
producing a sum signal by summing the obtained electrical signals according to the assigned signs and the assigned weighting factors;
comparing the sum signal to a preconfigured condition; and
in response to the sum signal fulfilling the pre-configured condition, providing a wakeup signal.

13. The method according to claim 12, wherein the preconfigured condition comprises at least one preconfigured threshold value for the sum signal.

14. The method according to claim 13, wherein the at least one preconfigured threshold value comprises a maximum value for the sum signal, a minimum value for the sum signal, and/or a maximum value for an absolute value of the sum signal.

* * * * *